(12) United States Patent
Cumming

(10) Patent No.: US 10,313,653 B1
(45) Date of Patent: Jun. 4, 2019

(54) SYSTEMS AND METHODS FOR PROCEDURAL RENDERING OF CINEMATIC VIRTUAL REALITY CONTENT

(71) Applicant: Secret Location Inc., Toronto (CA)

(72) Inventor: John Cumming, Toronto (CA)

(73) Assignee: Secret Location Inc., Toronto (CA)

( * ) Notice: Subject to any disclaimer, the term of this patent is extended or adjusted under 35 U.S.C. 154(b) by 6 days.

(21) Appl. No.: 15/814,314

(22) Filed: Nov. 15, 2017

(51) Int. Cl.
| | |
|---|---|
| *H04N 13/117* | (2018.01) |
| *G06T 3/00* | (2006.01) |
| *G06T 19/00* | (2011.01) |
| *H04N 13/133* | (2018.01) |
| *H04N 13/00* | (2018.01) |

(52) U.S. Cl.
CPC ......... *H04N 13/117* (2018.05); *G06T 3/0037* (2013.01); *G06T 19/003* (2013.01); *H04N 13/133* (2018.05); *H04N 2013/0081* (2013.01)

(58) Field of Classification Search
CPC ... H04N 13/117; H04N 13/113; G06T 3/0037
USPC ........................................................ 345/419
See application file for complete search history.

(56) References Cited

U.S. PATENT DOCUMENTS

| | | | | |
|---|---|---|---|---|
| 2007/0198209 A1* | 8/2007 | Sato | ....................... | G01C 17/28 702/155 |
| 2014/0035944 A1* | 2/2014 | Kulkarni | ............... | G06T 11/001 345/604 |
| 2014/0205168 A1* | 7/2014 | Kim | ........................ | A61B 8/46 382/131 |
| 2016/0323561 A1* | 11/2016 | Jin | ..................... | H04N 5/23267 |
| 2017/0090556 A1* | 3/2017 | Baba | ....................... | G06F 3/012 |

* cited by examiner

*Primary Examiner* — Hai Tao Sun
(74) *Attorney, Agent, or Firm* — Sheppard, Mullin, Richter & Hampton LLP

(57) ABSTRACT

Interactive content is obtained, the interactive content including a stereoscopic equirectangular video frame. A UV coordinate screen space is generated. A first location of the UV coordinate screen space is computed. A second location of the UV coordinate screen space is computed. A point of the UV coordinate screen space to procedurally render is selected. Virtual spherical coordinates are computed using the point of the UV coordinate screen space to procedurally render. The virtual spherical coordinates are rotated using a rotation matrix. An equirectangular coordinate value within the video frame is determined using the rotated virtual spherical coordinates. The pixel values of the stereoscopic equirectangular video frame are identified using the equirectangular coordinate value. The pixel values are returned for the UV coordinate screen space, thereby causing a corresponding presentation on a physical screen of an interactive content player device.

19 Claims, 9 Drawing Sheets

SYSTEMS AND METHODS FOR PROCEDURAL RENDERING OF CINEMATIC VIRTUAL REALITY CONTENT

TECHNICAL FIELD

This disclosure pertains to systems for rendering interactive content (e.g., virtual reality content, augmented reality content). More specifically, this disclosure pertains to systems for procedural rendering of interactive content.

BACKGROUND

Under convention approaches, dual-pass rendering techniques are used to render interactive content (e.g., virtual reality content, augmented reality content). One pass is used to render a left-eye portion of a video frame, and another pass is used to render a right-eye portion of the video frame. This dual-pass technique may cause distortion (e.g., linear interpolation distortion) when rendering interactive content. Additionally, dual-pass rendering techniques may be computationally intensive (e.g., for GPUs and/or central processing units (CPUs)).

SUMMARY

A claimed solution rooted in computer technology overcomes problems specifically arising in the realm of computer technology. In various embodiments, a computing system is configured to perform single-pass procedural rendering of interactive content. As used herein, "single pass" may refer to performing a single render pass in order to render a point in an interactive content video frame, as opposed to performing multiple render passes (e.g., a first render pass for a left-eye portion of the video frame and a second render pass for a right-eye portion of the video frame). The single-pass procedural rendering (or, simply, "procedural rendering") described herein may reduce and/or eliminate linear interpolation distortion (e.g., in a fragment shader) and/or reduce the computational requirements to render interactive content.

Various embodiments of the present disclosure include systems, methods, and non-transitory computer readable media configured to obtain interactive content, the interactive content including a stereoscopic equirectangular video frame. A UV coordinate screen space is generated, the UV coordinate screen space corresponding to a physical screen of an interactive content player device. A first location of the UV coordinate screen space is computed, the first location of the UV coordinate screen space comprising a first center of a first portion of the UV coordinate screen space. A second location of the UV coordinate screen space is computed, the second location of the UV coordinate screen space comprising a second center of a second portion of the UV coordinate screen space. A point of the UV coordinate screen space to procedurally render is selected, the point to procedurally render being within the first portion of the UV coordinate screen space or the second portion of the UV coordinate screen space. Virtual spherical coordinates are computed using the point of the UV coordinate screen space to procedurally render. A rotation matrix is obtained. The virtual spherical coordinates are rotated using the rotation matrix. An equirectangular coordinate value within the stereoscopic equirectangular video frame is determined using the rotated virtual spherical coordinates. Pixel values of the stereoscopic equirectangular video frame are identified using the equirectangular coordinate value. The pixel values of the stereoscopic equirectangular video frame are returned for the UV coordinate screen space, thereby causing a corresponding presentation on the physical screen of the interactive content player device.

In some embodiments, the interactive content comprises un-rendered cinematic virtual reality content.

In some embodiments, the interactive content player device comprises a virtual reality player device.

In some embodiments, the first portion of the UV coordinate screen space corresponds to a left-eye portion of the UV coordinate screen space, and the second portion of the UV coordinate screen space corresponds to a right-eye portion of the UV coordinate screen space.

In some embodiments, the systems, methods, and non-transitory computer readable media further configured to determine whether the point of the UV coordinate screen space to procedurally render is within the first portion of the UV coordinate screen space or the second portion of the UV coordinate screen space. In related embodiments, if the point of the UV coordinate screen space to procedurally render is within the second portion of the UV coordinate screen space, the instructions cause the system to perform: normalizing the point of the UV coordinate screen space to procedurally render to a corresponding point in the first portion of the UV coordinate screen space; and recording the point of the UV coordinate screen space to procedurally render is for the second portion of the UV coordinate screen space.

In some embodiments, the computing virtual spherical coordinates using the point of the UV coordinate screen space to procedurally render comprises projecting a line from an origin of a virtual sphere through a plane at the point of the UV coordinate screen space to procedurally render, the plane lying at a radius of the virtual sphere.

In some embodiments, the rotation matrix is obtained from the interactive content player device, and the rotation matrix indicates a position of a user's head.

In some embodiments, the rotating the virtual spherical coordinates using the rotation matrix comprises multiplying the virtual spherical coordinates by the rotation matrix, and subsequently normalizing the resultant vector to a predetermined length.

In some embodiments, if the point of the UV coordinate screen space to procedurally render is within the second portion of the UV coordinate screen space, the determining the equirectangular coordinate value within the stereoscopic equirectangular video frame using the rotated virtual spherical coordinates further comprises subsequently adding a predetermined value to the equirectangular coordinate value.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

In various embodiments, a computing system is configured to perform single-pass procedural rendering of interactive content. As used herein, "single pass" may refer to performing a single render pass in order to render a point in an interactive content video frame, as opposed to performing multiple render passes (e.g., a first pass for a left-eye portion of the video frame and a second pass for a right-eye portion of the video frame). The single-pass procedural rendering (or, simply, "procedural rendering") described herein may reduce and/or eliminate linear interpolation distortion (e.g., in a fragment shader) and/or reduce the computational requirements to render interactive content.

Figure 1:
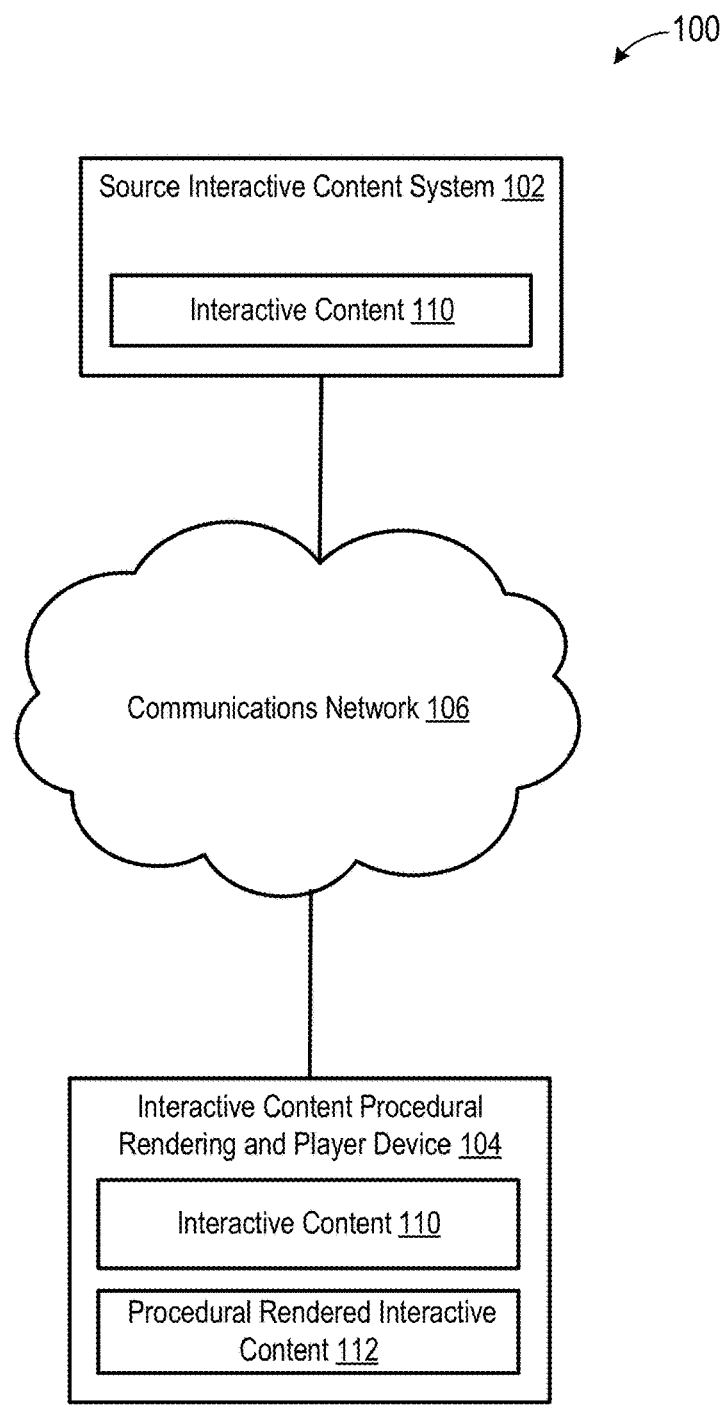
FIG. 1 depicts a diagram of an example system for procedural rendering and presentation of interactive content according to some embodiments.

FIG. 1 depicts a diagram 100 of an example system for procedural rendering and presentation of interactive content according to some embodiments. In the example of FIG. 1, the system includes an interactive content system 102, an interactive content procedural rendering and player system 104, and a communication network 106.

Figure 4:
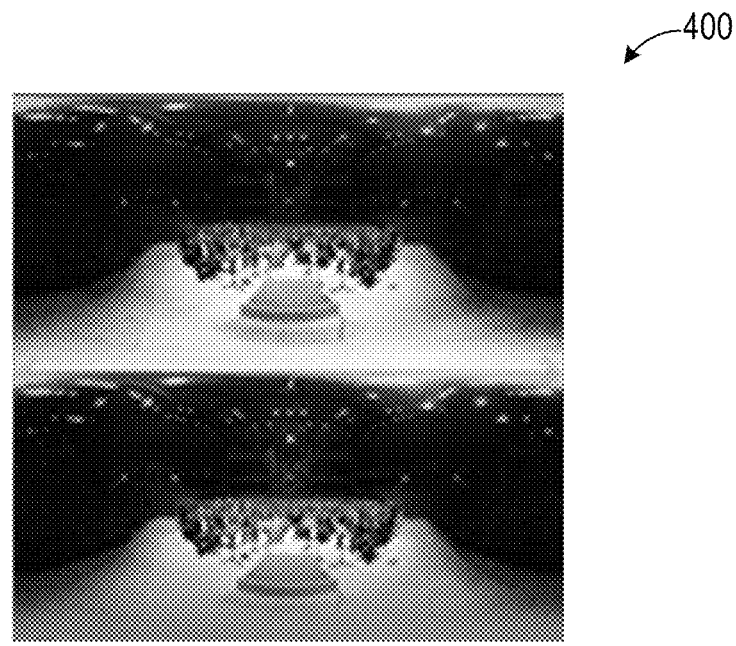
FIG. 4 depicts a diagram of an example stereoscopic equirectangular video frame according to some embodiments.

The interactive content system 102 may function to create, store, and/or provide interactive content 110. Interactive content 110 may include virtual reality (VR) content (e.g., cinematic VR content, interactive VR content), augmented reality (AR) content, and/or the like. Interactive content 110 may be encoded such that each video frame of the interactive content 110 comprises a left-eye and a right-eye vertically stacked stereoscopic equirectangular video frame. An example stereoscopic equirectangular video frame is depicted in FIG. 4. In various embodiments, functionality of the interactive content system 102 may be performed by one or more servers (e.g., a cloud-based server) and/or other computing devices. The interactive content system 102 may be implemented by one or more desktop computers, laptop computers, mobile device (e.g., smartphones, tablets, and/or the like), servers (e.g., a cloud-based server) and/or other computing devices. Although only one interactive content system 102 is shown here, it will be appreciated that embodiments may include any number of interactive content systems 102.

Figure 5:
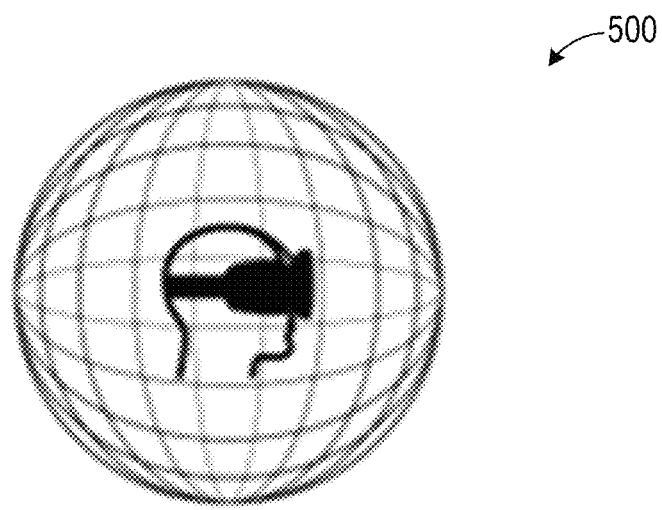
FIG. 5 depicts a diagram of an example spherical mesh with a camera at a center of the sphere according to some embodiments.
Figure 6:
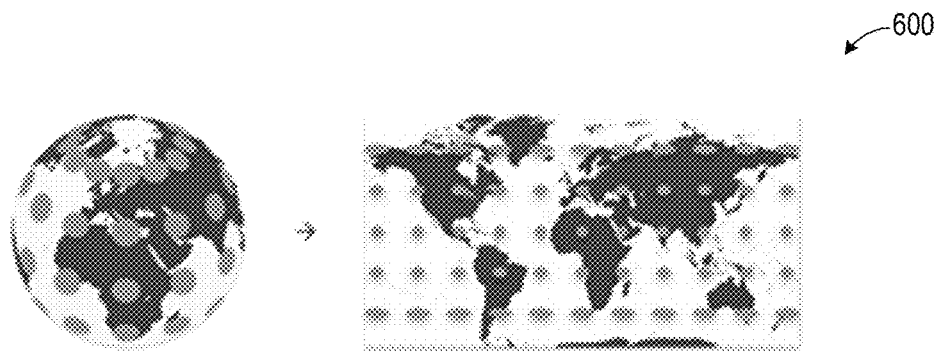
FIG. 6 depicts a diagram of an example equirectangular to spherical mapping according to some embodiments.

Typically, in order for each interactive content video frame to be presented to a user's eyes (e.g., via a VR headset), the interactive content video frames need to be re-projected. Traditionally, this may be done by creating a spherical mesh, and projecting each eye half (e.g., left-eye portion, right-eye portion) of the interactive content video frame in turn onto a spherical mesh, with a camera at the center of spherical mesh (e.g., as shown in FIG. 5). This approach is a simple approach for rendering interactive content video frames, where the reprojection of the video frame may be mapped using the spherical mesh. However, this approach may create distortion, for example, because of how modern GPUs linearly interpolate between vertices of the spherical mesh (e.g., as shown in FIG. 6). This interpolation may require increasing the vertex density of the spherical mesh, thereby increasing the computational workload (e.g., on a CPU and/or GPU).

The interactive content procedural rendering and player system 104 may function to obtain, store, render, and/or present (e.g., playback) interactive content 110. For example, the interactive content procedural rendering and player system 104 may render and present cinematic VR interactive content to a user. In various embodiments, functionality of the interactive content procedural rendering and player system 104 may be performed by one or more VR headsets, AR devices, mobile phones, and/or other computing devices, albeit as adapted according to the teachings hereof. For example, the interactive content procedural rendering and player system 104 may include one or more GPUs, CPUs, shaders, fragment shaders, and/or the like. Although only one interactive content procedural rendering and player system 104 is shown here, it will be appreciated that embodiments may include any number of interactive content procedural rendering and player systems 104.

The interactive content procedural rendering and player system 104 may function to perform procedural rendering of interactive content 110. More specifically, the interactive content procedural rendering and player system 104 may use procedural rendering to implement single-pass screen space rendering (e.g., as opposed to dual-pass). Generally, in order to render in a single pass, the interactive content procedural rendering and player system 104 may determine whether a point to render is within a first portion (e.g., left-eye portion) of a screen space of the interactive content procedural rendering and player system 104 (e.g., screen space of a VR headset) or whether the point to render is within a second portion (e.g., right-eye portion) of the screen space of the interactive content procedural rendering and player system 104. If the point is within the second portion, the interactive content procedural rendering and player system 104 may normalize the point to a corresponding point in the first portion. The normalization may be stored, thereby allowing the steps of the procedural rendering pass to account for a point in the second portion, without having to execute additional render passes. Procedural rendering is discussed further herein.

The communication network 106 may represent one or more computer networks (e.g., LAN, WAN, or the like) or other transmission mediums. The communication network 106 may provide communication between systems 102 and 104 and/or other systems described herein. In some embodiments, the communication network 106 includes one or more computing devices, routers, cables, buses, and/or other network topologies (e.g., mesh, and the like). In some embodiments, the communication network 106 may be wired and/or wireless. In various embodiments, the communication network 106 may include the Internet, one or more wide area networks (WANs) or local area networks (LANs), one or more networks that may be public, private, IP-based, non-IP based, and so forth.

Figure 2:
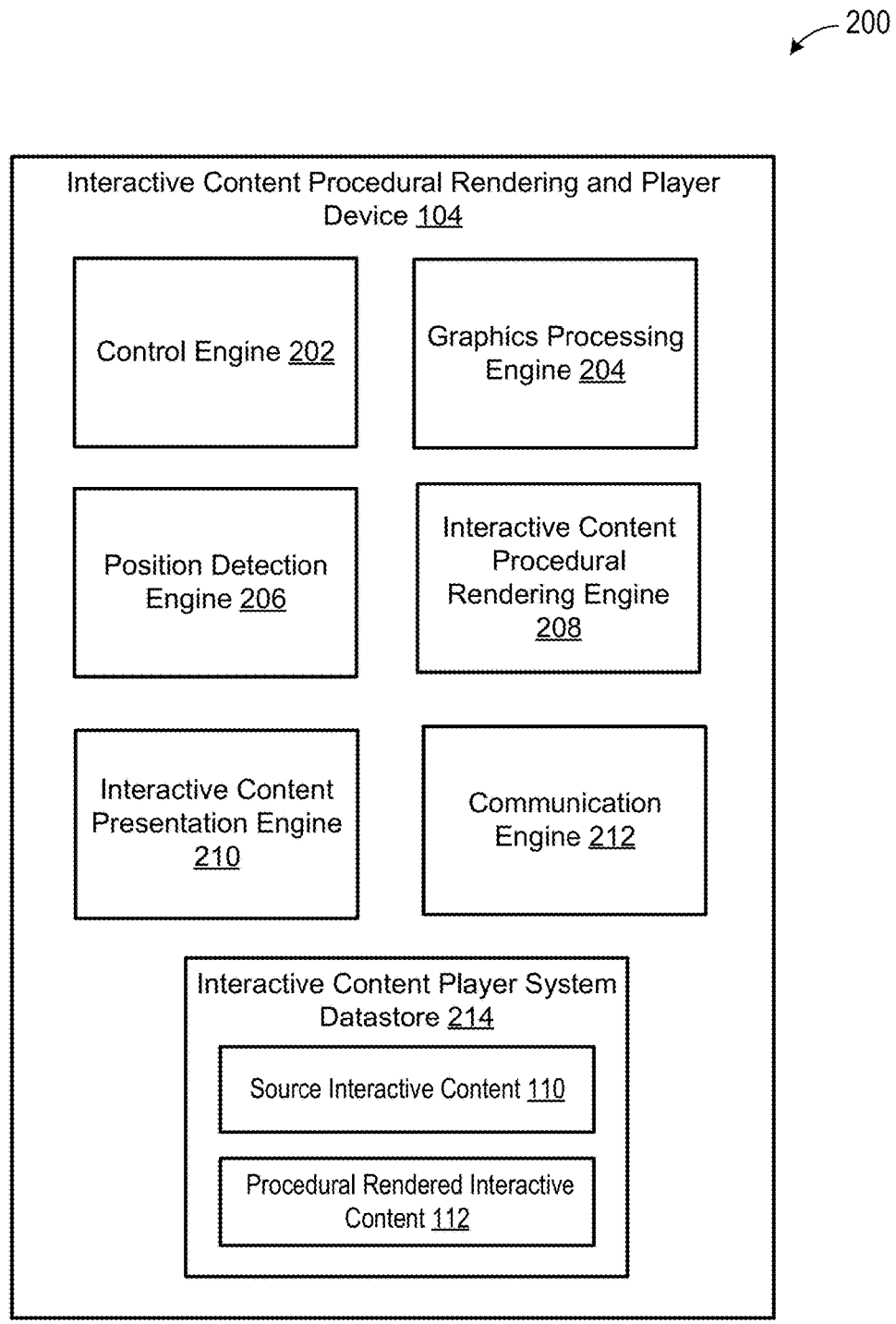
FIG. 2 depicts a diagram of an example interactive content procedural rendering and player system according to some embodiments.

FIG. 2 depicts a diagram 200 of an example of an interactive content procedural rendering and player system 104 according to some embodiments. In the example of FIG. 2, the interactive content procedural rendering and player system 104 includes a control engine 202, a graphics processing engine 204, a position detection engine 206, an interactive content procedural rendering engine 208, an interactive content presentation engine 210, a communication engine 212, and an interactive content procedural rendering and player system datastore 214.

The control engine 202 may function to present a control environment. For example, the control environment may comprise an interactive content display (e.g., a VR display include menus, icons, and/or the like). The control environment may include a library of interactive content items. The control engine 302 may select interactive content items for dynamic playback (e.g., in response to user input).

The graphics processing engine 204 may function to facilitate rendering and/or presentation of interactive content 110, rendered interactive content 112, and/or other graphic images. The graphics processing engine 204 may comprise and/or access one or more GPUs, CPUs, shaders, fragment shaders, and/or the like. Like the other engines described herein, the graphics processing engine 204 may cooperate with the interactive content procedural rendering engine 208 to facilitate procedural rendering of interactive content 110.

The position detection engine 206 may function to determine one or more positions of a user and/or compute corresponding rotation matrices. For example, the position detection engine 206 may determine head position of a user, eye (e.g., pupil) position of a user, and/or the like. The position detection engine 206 may compute one or more rotational matrices based on one or more detected positions. The position detection engine 206 may include one or more motion sensors (e.g., gyroscopes, accelerometers, magnetometers, and/or signal processors) to detect positions.

The interactive content procedural rendering engine 208 may function to generate procedural rendered interactive content 112 from interactive content 110. In some embodiments, the interactive content procedural rendering engine 208 computes the location of the center of each eye within the screen space of the system 104, and converts that to UV coordinate(s) for use by the graphics processing engine 204 (e.g., by a fragment shader of the graphics processing engine 204). In some embodiments, the interactive content procedural rendering engine 208 determines which eye the point (p) to render is in, and then normalizes it to a left eye coordinate if it is in the right eye space (or, "portion"). In some embodiments, the actual position of the eye center in UV coordinates may be represented as follows:

$$eye_u = \frac{Screen_u - PD * PPI_u}{2}$$

$$eye_v = 0.5$$

If $eye_u$ is greater than 0.5 then normalize to left eye by:

$$eye_u = eye_u - 0.5$$

Figure 9:
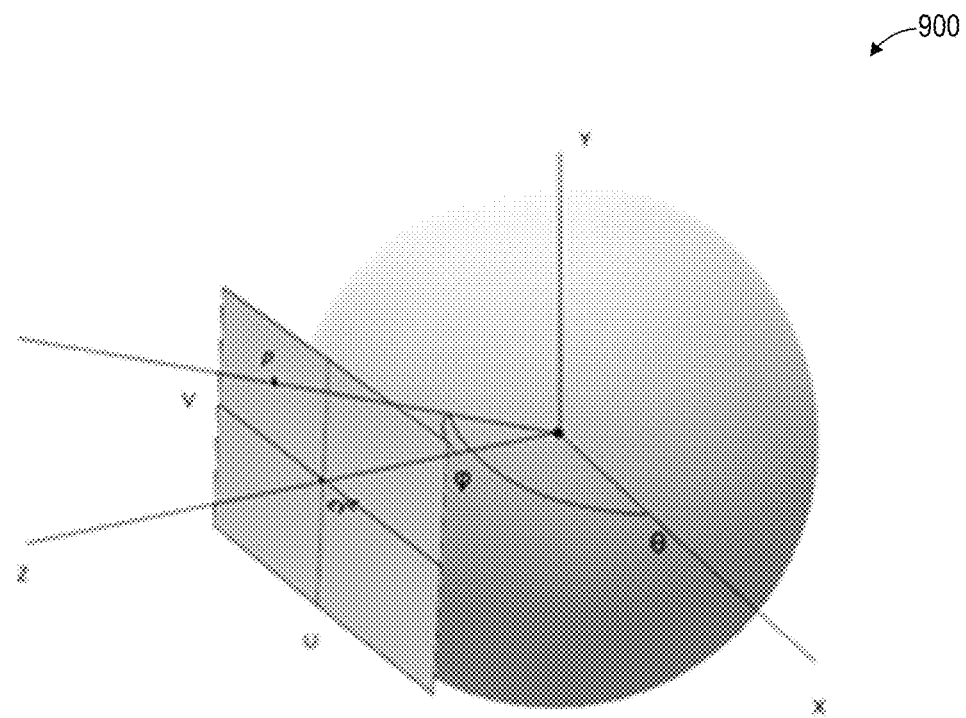
FIG. 9 depicts a diagram of an example virtual spherical coordinate derivation according to some embodiments.

In some embodiments, if rendering is being performed for a point in the right-eye space, the interactive content procedural rendering engine 208 records (or, "stores") that rendering is for a point in the right-eye space. In some embodiments, formulae definitions include:

$Screen_u$: landscape screen width in pixels
PD: pupillary distance
$PPI_u$: screen pixel density In some embodiments, the interactive content procedural rendering engine 208 functions to compute virtual spherical coordinates. With reference to FIG. 9, spherical coordinates may be calculated by projecting a line from the origin of the virtual sphere through a plane at the point to render (p), as the plane lies at the radius of the sphere. Then deriving the azimuth (θ) and altitude (φ) using the vector (p—eye) and the Field of View (FOV) in radians. In some embodiments, spherical coordinates of the point intersecting the sphere along the vector (p—origin) can be calculated assuming a radius of 1.0.

In some embodiments, spherical coordinates are calculated as follows:

$$\theta = (p_u - eye_u) \times FOV_u$$

$$\varphi = (p_v - eye_v) \times FOV_v$$

In some embodiments, cartesian coordinates are calculated after the spherical coordinates as follows:

$$spherical_x = \sin\theta \times \cos\varphi$$

$$spherical_y = \sin\varphi$$

$$spherical_z = \cos\theta \times \cos\varphi$$

In some embodiments, the interactive content procedural rendering engine 208 functions to rotate virtual spherical coordinates. The interactive content procedural rendering engine 208 may rotate the virtual spherical coordinates using a rotation matrix (e.g., provided by the position detection engine 206) indicating a position of a user's head. This may be performed by multiplying the virtual spherical coordinates (spherical) by the headset rotation matrix (rotation), and then normalizing the resultant vector to a predetermined length (e.g., 1.0):

$$rotated = normalize(rotation\tilde{A} - spherical)$$

Figure 10:
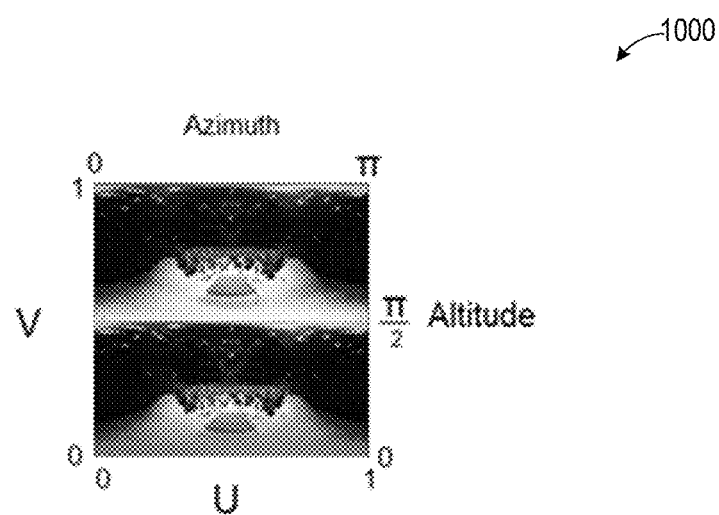
FIG. 10 depicts a diagram of an example video frame mapped to an example UV coordinate space according to some embodiments.

In some embodiments, the interactive content procedural rendering engine 208 functions to compute equirectangular coordinates. More specifically, the interactive content procedural rendering engine 208 may determine the coordinates to sample within the equirectangular video frame. The following equations assume a stereoscopic over under video frame. In some embodiments, the equirectangular video frame may be mapped to the UV coordinate space (e.g., as shown in FIG. 10).

In some embodiments, the interactive content procedural rendering engine 208 calculates the rotated azimuth (θ) and altitude (φ) using the rotated spherical coordinates (rotated) by converting them to polar coordinates:

$$\theta = \operatorname{atan}\frac{rotated_z}{rotated_x}$$

$$\varphi = \operatorname{acos} rotated_y$$

In some embodiments, the interactive content procedural rendering engine 208 then converts from polar coordinates to UV coordinates, and then adjusts the UV value for the eye being rendered on screen:

$$equirectangular_u = \frac{\varphi}{2\pi}$$

$$equirectangular_v = \frac{\theta}{2\pi}$$

In some embodiments, if the interactive content procedural rendering engine 208 is rendering for the right eye, the equation may be represented as follows:

$$equirectangular_v = equirectangular_v + 0.5$$

Figure 11:
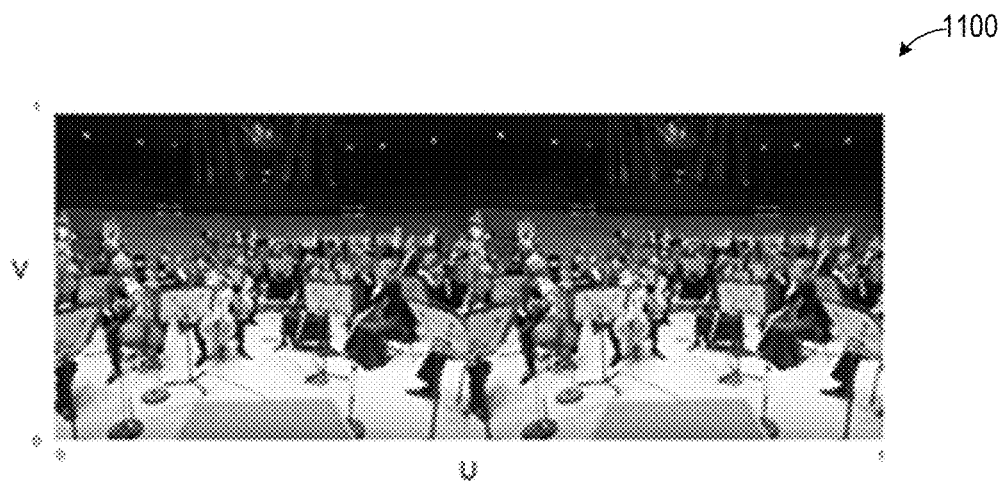
FIG. 11 depicts a diagram of an example video frame procedurally rendered according to some embodiments.

In some embodiments, the interactive content procedural rendering engine 208 functions to perform texture lookups. The interactive content procedural rendering engine 208 may use the equirectangular value to look up the pixel values in the video frame, and have the graphics processing engine 208 (e.g., a fragment shader of the graphics processing engine 208) return them for the screen space UV coordinates. An example procedural rendered video frame is shown in FIG. 11.

The interactive content presentation engine 210 may function to present (e.g., playback) rendered interactive content 112. For example, interactive content presentation engine 210 may include playback functionality, a screen (e.g., LED display, LCD display, and/or other physical screen) for displaying rendered interactive content 112, and/or the like. The screen may comprise a single unified screen for displaying rendered interactive content 112 for both the left-eye and right-eye of a user, or it may comprise separate screens (e.g., a first screen for a left-eye of a user and a second screen for a right-eye of a user). As used here, screen may refer to a single unified screen and/or separate screens.

The communication engine 212 may function to send requests, transmit and, receive communications, and/or otherwise provide communication with one or a plurality of systems. In some embodiments, the communication engine 212 functions to encrypt and decrypt communications. The communication engine 212 may function to send requests to and receive data from one or more systems through a network or a portion of a network. Depending upon implementation-specified considerations, the communication engine 212 may send requests and receive data through a connection, all or a portion of which may be a wireless connection. The communication engine 212 may request and receive messages, and/or other communications from associated systems. Communications may be stored at least temporarily (e.g., cached and/or persistently) in the interactive content procedural rendering and player system datastore 214.

The interactive content procedural rendering and player system datastore 214 may function to store, at least temporarily, data received from one or more other systems. For example, the interactive content procedural rendering and player system datastore 214 may store interactive content 110 (e.g., obtained from remote systems and/or local systems), procedural rendered interactive content 112, messages received by the communication engine 212, and/or the like. The interactive content procedural rendering and player system datastore 214 may reside local to the interactive content procedural rendering and player system 104, and/or comprise an associated remote storage system (e.g., a cloud storage system).

Figure 3:
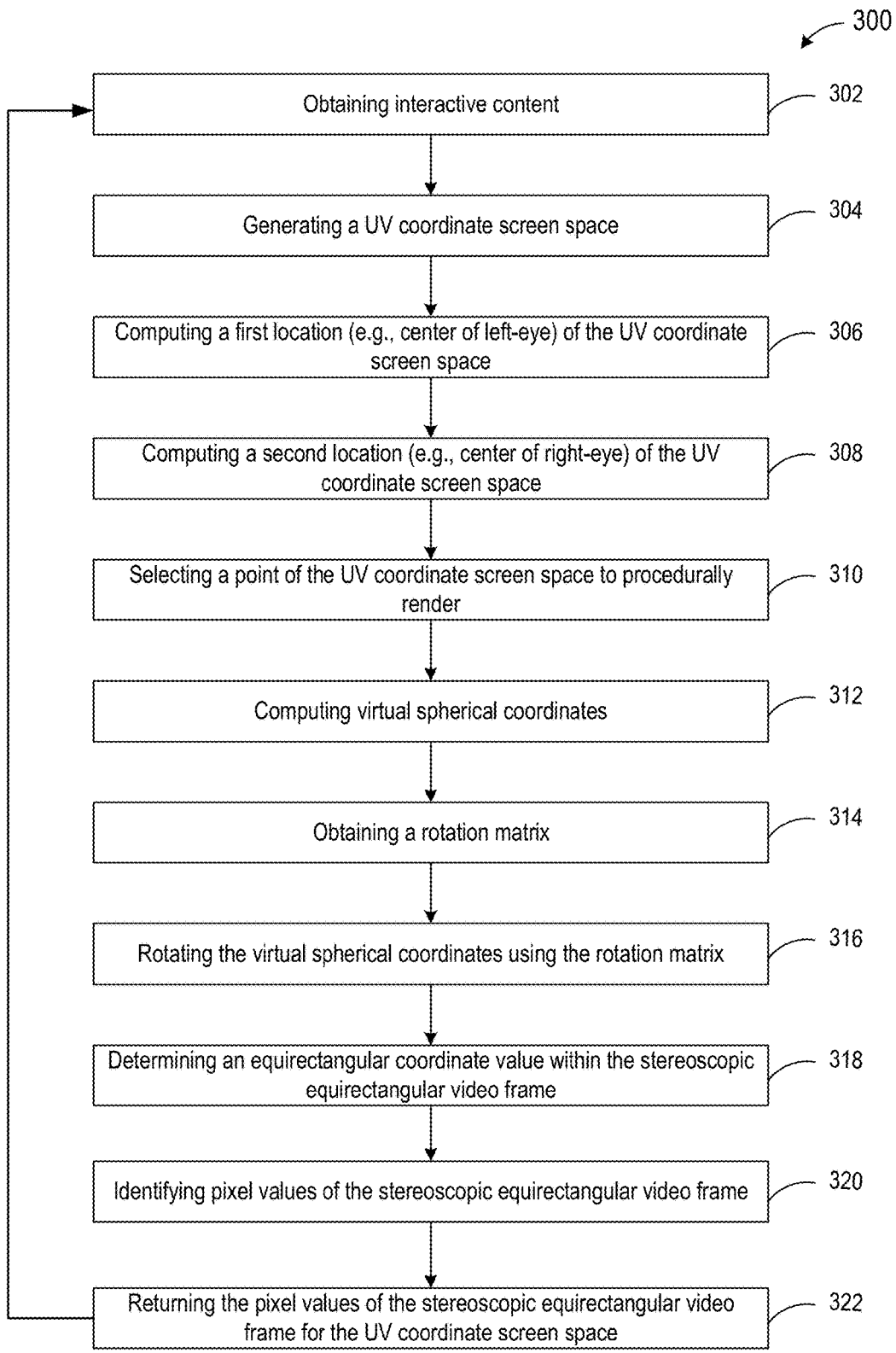
FIG. 3 depicts a flowchart of an example method of procedural rendering of interactive content according to some embodiments.

FIG. 3 depicts a flowchart 300 of an example of a method of procedural rendering of interactive content according to some embodiments. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 302, an interactive content procedural rendering and player system (e.g., interactive content procedural rendering and player system 104) obtains interactive content (e.g., interactive content 110). The interactive content may comprise un-rendered cinematic virtual reality content. In some embodiments, a communication engine (e.g., communication engine 212) obtains the interactive content over a communications network (e.g., communication network 106) and stores the interactive content in a datastore (e.g., interactive content procedural rendering and player system datastore 214).

In some embodiments, the interactive content procedural rendering and player system obtains the interactive content in response to user input. For example, the interactive content procedural rendering and player system may present a graphical interface (e.g., a "library") of available interactive content from which a user may select the interactive content. A control engine (e.g., control engine 202) may receive the user input and present the graphical interface. The control engine may cooperate with a graphics processing engine (e.g., graphics processing engine 204) to present the graphical interface and/or receive user input.

In step 304, the interactive content procedural rendering and player system generates a UV coordinate screen space. The UV coordinate screen space may correspond to a physical screen of the interactive content procedural rendering and player system. In some embodiments, an interactive content procedural rendering engine (e.g., interactive content procedural rendering engine 208) generates the UV coordinate screen space.

In step 306, the interactive content procedural rendering and player system computes a first location of the UV coordinate screen space. The first location of the UV coordinate screen space may comprise a first center of a first portion of the UV coordinate screen space. For example, the first portion of the UV coordinate screen space corresponds to a left-eye portion of the UV coordinate screen space. In some embodiments, the interactive content procedural rendering engine computes the first location.

In step 308, the interactive content procedural rendering and player system computes a second location of the UV coordinate screen space. The second location of the UV coordinate screen space may comprise a second center of a second portion of the UV coordinate screen space. For example, the second portion of the UV coordinate screen space corresponds to a right-eye portion of the UV coordinate screen space. In some embodiments, the interactive content procedural rendering engine computes the second location.

In step 310, the interactive content procedural rendering and player system selects a point of the UV coordinate screen space to procedurally render. The point to procedurally render may be within the first portion of the UV coordinate screen space or the second portion of the UV coordinate screen space. In some embodiments, the interactive content procedural rendering engine and/or graphics processing unit selects the point.

In some embodiments, the interactive content procedural rendering and player system determines whether the point of the UV coordinate screen space to procedurally render is within the first portion of the UV coordinate screen space or the second portion of the UV coordinate screen space. In some embodiments, the interactive content procedural rendering engine performs the determination.

In some embodiments, if the point of the UV coordinate screen space to procedurally render is within the second portion of the UV coordinate screen space, the interactive content procedural rendering and player system may normalize the point of the UV coordinate screen space to procedurally render to a corresponding point in the first portion of the UV coordinate screen space, and record the point of the UV coordinate screen space to procedurally render is for the second portion of the UV coordinate screen space. For example, the interactive content procedural rendering and player system may record (e.g., store) the point (e.g., corresponding coordinates) in the datastore.

In step 312, the interactive content procedural rendering and player system (e.g., the interactive content procedural rendering engine) computes virtual spherical coordinates using the point of the UV coordinate screen space to procedurally render.

In some embodiments, the interactive content procedural rendering and player system (e.g., the interactive content procedural rendering engine) computes the virtual spherical coordinates using the point of the UV coordinate screen space to procedurally render by projecting a line from an origin of a virtual sphere through a plane at the point of the UV coordinate screen space to procedurally render, the plane lying at a radius of the virtual sphere.

In step 314, the interactive content procedural rendering and player system obtains a rotation matrix. In some embodiments, the interactive content procedural rendering engine obtain the matrix from a position detection engine (e.g., position detection engine 206).

In step 316, the interactive content procedural rendering and player system rotates the virtual spherical coordinates using the rotation matrix. In some embodiments, the interactive content procedural rendering engine rotates the virtual spherical coordinates.

In some embodiments, the interactive content procedural rendering and player system (e.g., the interactive content procedural rendering engine) rotates the virtual spherical coordinates using the rotation matrix comprises multiplying the virtual spherical coordinates by the rotation matrix, and subsequently normalizing the resultant vector to a predetermined length.

In step 318, the interactive content procedural rendering and player system determines an equirectangular coordinate value within the stereoscopic equirectangular video frame using the rotated virtual spherical coordinates. In some embodiments, the interactive content procedural rendering engine determines the equirectangular coordinate value.

In some embodiments, if the point of the UV coordinate screen space to procedurally render is within the second portion of the UV coordinate screen space, the interactive content procedural rendering and player system (e.g., the interactive content procedural rendering engine) determines the equirectangular coordinate value within the stereoscopic equirectangular video frame using the rotated virtual spherical coordinates and subsequently adds a predetermined value (e.g., 0.5) to the equirectangular coordinate value.

In step 320, the interactive content procedural rendering and player system identifies pixel values of the stereoscopic equirectangular video frame using the equirectangular coordinate value. In some embodiments, the interactive content procedural rendering engine identifies the pixel values.

In step 322, the interactive content procedural rendering and player system returns the pixel values of the stereoscopic equirectangular video frame for the UV coordinate screen space, thereby causing a corresponding presentation of the procedural rendered stereoscopic equirectangular video frame (e.g., procedural rendered from of procedural rendered interactive content 112) on the physical screen of the interactive content player device. In some embodiments, the graphics processing engine returns the pixel values and presents the procedural rendered stereoscopic equirectangular video frame. For example, a shader and/or fragment shader of the graphics processing engine returns the pixel values.

It will be appreciated that any of the steps 302-322 may be repeated serially and/or in parallel in order to procedural render one or more interactive content video frames.

Figure 7:
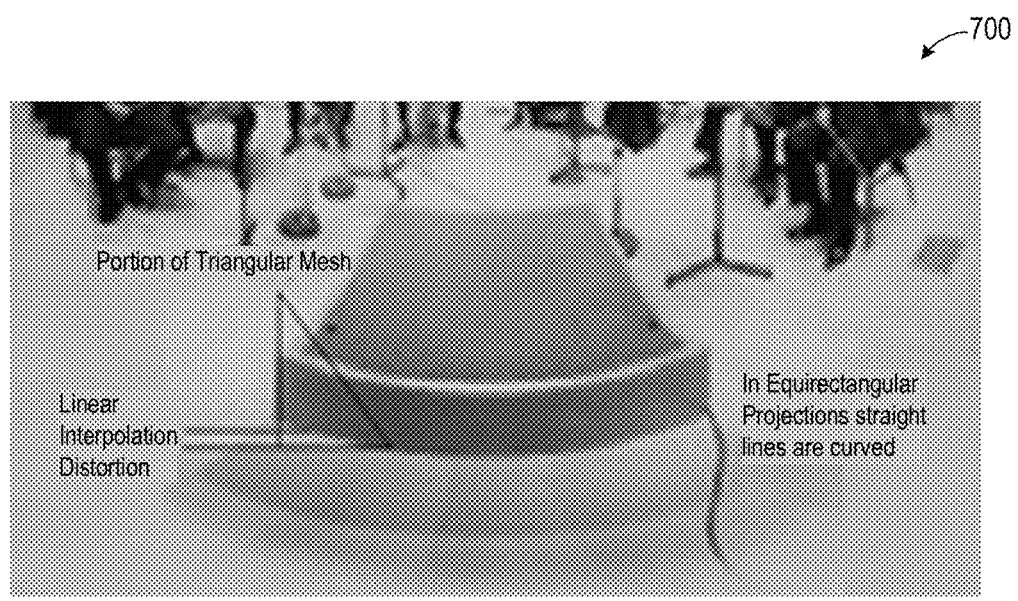
FIG. 7 depicts a diagram of an example distortion due to linear interpolation in a fragment shader according to some embodiments.

FIG. 4 depicts a diagram 400 of an example stereoscopic equirectangular video frame according to some embodiments. FIG. 5 depicts a diagram 500 of an example spherical mesh with a camera at a center of the sphere according to some embodiments. FIG. 6 depicts a diagram 600 of an example equirectangular to spherical mapping according to some embodiments. FIG. 7 depicts a diagram 700 of an example distortion due to linear interpolation in a fragment shader according to some embodiments.

Figure 8:
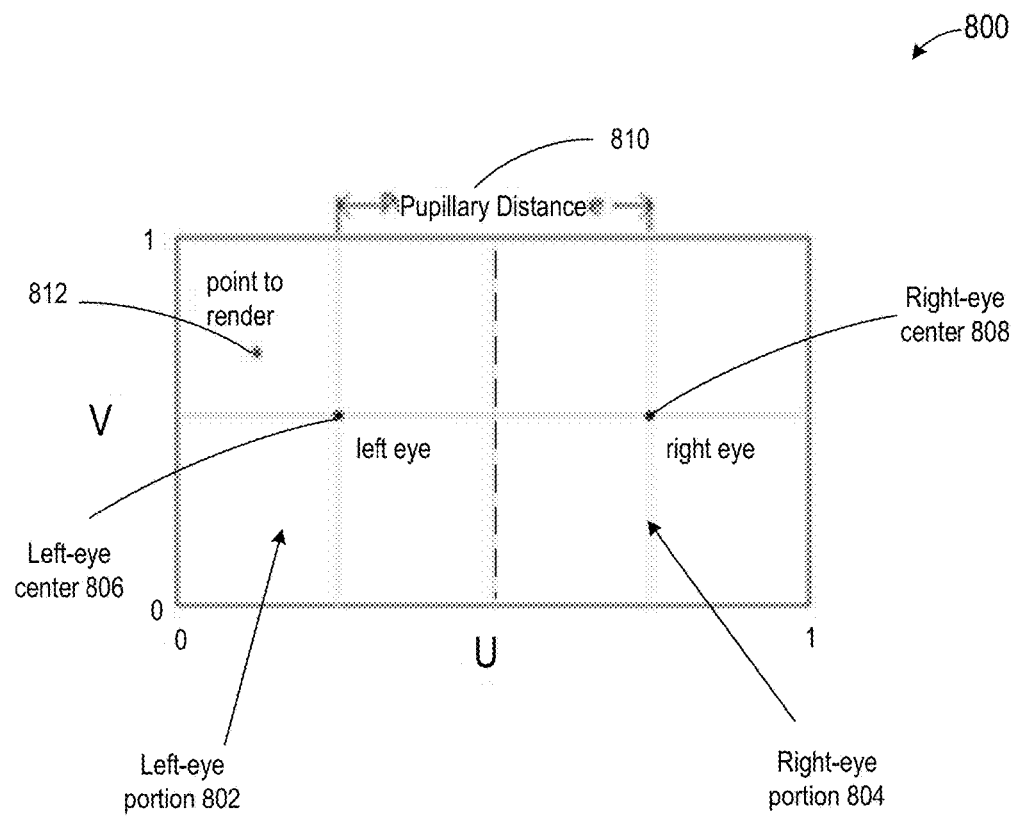
FIG. 8 depicts a diagram of an example UV coordinate space of a corresponding interactive content player device screen according to some embodiments.

FIG. 8 depicts a diagram 800 of an example UV coordinate space of a corresponding interactive content player device screen according to some embodiments. The coordinate values are shown between 0 and 1, although this is for example purposes and other values may be used. The example UV coordinate space includes a left-eye portion 802, a right-eye portion 804, a left-eye center 806, a right-eye center 808, a pupillary distance 810, and a point to render 812.

FIG. 9 depicts a diagram 900 of an example virtual spherical coordinate derivation according to some embodiments. FIG. 10 depicts a diagram 1000 of an example video frame mapped to an example UV coordinate space according to some embodiments. FIG. 11 depicts a diagram 1100 of an example video frame procedurally rendered (e.g., for a virtual reality headset and/or other interactive content player device) according to some embodiments.

Figure 12:
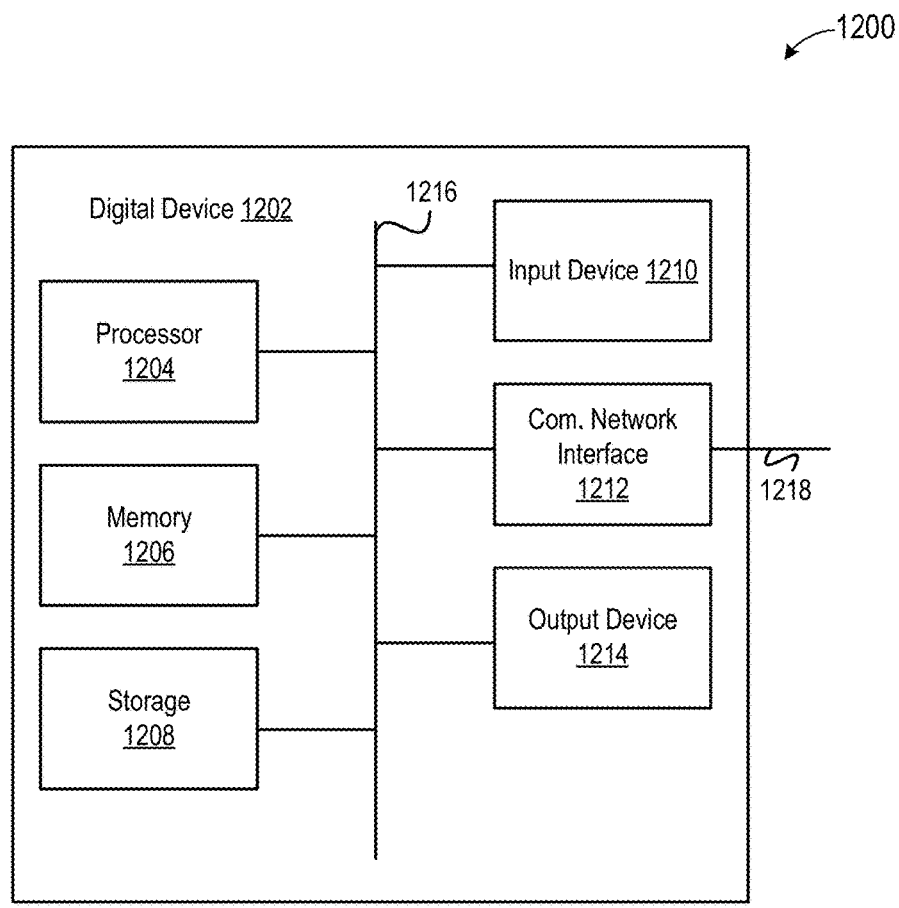
FIG. 12 is a diagram of an example computer system for implementing the features disclosed herein.

FIG. 12 depicts a diagram 1200 of an example of a computing device 1202. Any of the systems 102-108, and the communication network 106 may comprise an instance of one or more computing devices 1202. The computing device 1202 comprises a processor 1204, memory 1206, storage 1208, an input device 1210, a communication network interface 1212, and an output device 1214 communicatively coupled to a communication channel 1216. The processor 1204 is configured to execute executable instructions (e.g., programs). In some embodiments, the processor 1204 comprises circuitry or any processor capable of processing the executable instructions.

The memory 1206 stores data. Some examples of memory 1206 include storage devices, such as RAM, ROM, RAM cache, virtual memory, etc. In various embodiments, working data is stored within the memory 1206. The data within the memory 1206 may be cleared or ultimately transferred to the storage 1208.

The storage 1208 includes any storage configured to retrieve and store data. Some examples of the storage 1208 include flash drives, hard drives, optical drives, cloud storage, and/or magnetic tape. Each of the memory system 1206 and the storage system 1208 comprises a computer-readable medium, which stores instructions or programs executable by processor 1204.

The input device 1210 is any device that inputs data (e.g., mouse and keyboard). The output device 1214 outputs data (e.g., a speaker or display). It will be appreciated that the storage 1208, input device 1210, and output device 1214 may be optional. For example, the routers/switchers may comprise the processor 1204 and memory 1206 as well as a device to receive and output data (e.g., the communication network interface 1212 and/or the output device 1214).

The communication network interface 1212 may be coupled to a network (e.g., network 106) via the link 1218. The communication network interface 1212 may support communication over an Ethernet connection, a serial connection, a parallel connection, and/or an ATA connection. The communication network interface 1212 may also support wireless communication (e.g., 802.11 a/b/g/n, WiMax, LTE, WiFi). It will be apparent that the communication network interface 1212 may support many wired and wireless standards.

It will be appreciated that the hardware elements of the computing device 1202 are not limited to those depicted in FIG. 12. A computing device 1202 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1204 and/or a co-processor located on a GPU (e.g., Nvidia GPU).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A system for procedural rendering of interactive content, the system comprising:
   one or more processors; and
   memory storing instructions that, when executed by the one or more processors, cause the system to perform:
   obtaining interactive content, the interactive content including a stereoscopic equirectangular video frame;
   generating a UV coordinate screen space, the UV coordinate screen space corresponding to a physical screen of an interactive content player device;
   computing a first location of the UV coordinate screen space, the first location of the UV coordinate screen space comprising a first center of a first portion of the UV coordinate screen space;
   computing a second location of the UV coordinate screen space, the second location of the UV coordinate screen space comprising a second center of a second portion of the UV coordinate screen space;
   selecting a point of the UV coordinate screen space to procedurally render, the point to procedurally render being within the first portion of the UV coordinate screen space or the second portion of the UV coordinate screen space;
   computing virtual spherical coordinates using the point of the UV coordinate screen space to procedurally render, the computing the virtual spherical coordinates comprising projecting a line from an origin of a virtual sphere through a plane at the point of the UV coordinate screen space to procedurally render, the plane lying at a radius of the virtual sphere, and subsequently deriving an azimuth value and an altitude value based on the projected line;

obtaining a rotation matrix;

rotating the virtual spherical coordinates using the rotation matrix;

determining equirectangular UV coordinate values within the stereoscopic equirectangular video frame using the rotated virtual spherical coordinates, the equirectangular UV coordinate values being based on a rotation of the azimuth and altitude values;

identifying pixel values of the stereoscopic equirectangular video frame using the equirectangular UV coordinate values; and returning the pixel values of the stereoscopic equirectangular video frame for the UV coordinate screen space, thereby causing a corresponding presentation on the physical screen of the interactive content player device.

2. The system of claim 1, wherein the interactive content comprises un-rendered cinematic virtual reality content.

3. The system of claim 1, wherein the interactive content player device comprises a virtual reality player device.

4. The system of claim 1, wherein the first portion of the UV coordinate screen space corresponds to a left-eye portion of the UV coordinate screen space, and the second portion of the UV coordinate screen space corresponds to a right-eye portion of the UV coordinate screen space.

5. The system of claim 1, wherein the instructions further cause the system to determine whether the point of the UV coordinate screen space to procedurally render is within the first portion of the UV coordinate screen space or the second portion of the UV coordinate screen space.

6. The system of claim 5, wherein if the point to procedurally render is within the second portion of the UV coordinate screen space, the instructions cause the system to perform:

normalizing the point of the UV coordinate screen space to procedurally render to a corresponding point in the first portion of the UV coordinate screen space; and recording the point of the UV coordinate screen space to procedurally render for the second portion of the UV coordinate screen space.

7. The system of claim 1, wherein the rotation matrix is obtained from the interactive content player device, and the rotation matrix indicates a position of a user's head.

8. The system of claim 1, wherein the rotating the virtual spherical coordinates using the rotation matrix comprises multiplying the virtual spherical coordinates by the rotation matrix, and subsequently normalizing a resultant vector to a predetermined length.

9. The system of claim 1, wherein if the point of the UV coordinate screen space to procedurally render is within the second portion of the UV coordinate screen space, the determining the equirectangular UV coordinate values within the stereoscopic equirectangular video frame using the rotated virtual spherical coordinates further comprises subsequently adding a predetermined value to at least one of the equirectangular UV coordinate values.

10. A method being implemented by a computing system including one or more physical processors and storage media storing machine-readable instructions, the method comprising:

obtaining interactive content, the interactive content including a stereoscopic equirectangular video frame;

generating a UV coordinate screen space, the UV coordinate screen space corresponding to a physical screen of an interactive content player device;

computing a first location of the UV coordinate screen space, the first location of the UV coordinate screen space comprising a first center of a first portion of the UV coordinate screen space;

computing a second location of the UV coordinate screen space, the second location of the UV coordinate screen space comprising a second center of a second portion of the UV coordinate screen space;

selecting a point of the UV coordinate screen space to procedurally render, the point to procedurally render being within the first portion of the UV coordinate screen space or the second portion of the UV coordinate screen space;

computing virtual spherical coordinates using the point of the UV coordinate screen space to procedurally render, the computing the virtual spherical coordinates comprising projecting a line from an origin of a virtual sphere through a plane at the point of the UV coordinate screen space to procedurally render, the plane lying at a radius of the virtual sphere, and subsequently deriving an azimuth value and an altitude value based on the projected line;

obtaining a rotation matrix;

rotating the virtual spherical coordinates using the rotation matrix;

determining equirectangular UV coordinate values within the stereoscopic equirectangular video frame using the rotated virtual spherical coordinates, the equirectangular UV coordinate values being based on a rotation of the azimuth and altitude values;

identifying pixel values of the stereoscopic equirectangular video frame using the equirectangular UV coordinate values; and returning the pixel values of the stereoscopic equirectangular video frame for the UV coordinate screen space, thereby causing a corresponding presentation on the physical screen of the interactive content player device.

11. The method of claim 10, wherein the interactive content comprises un-rendered cinematic virtual reality content.

12. The method of claim 10, wherein the interactive content player device comprises a virtual reality player device.

13. The method of claim 10, wherein the first portion of the UV coordinate screen space corresponds to a left-eye portion of the UV coordinate screen space, and the second portion of the UV coordinate screen space corresponds to a right-eye portion of the UV coordinate screen space.

14. The method of claim 10, further comprising determining whether the point of the UV coordinate screen space to procedurally render is within the first portion of the UV coordinate screen space or the second portion of the UV coordinate screen space.

15. The method of claim 14, wherein if the point to procedurally render is within the second portion of the UV coordinate screen space, the method further comprises:

normalizing the point of the UV coordinate screen space to procedurally render to a corresponding point in the first portion of the UV coordinate screen space; and recording the point of the UV coordinate screen space to procedurally render for the second portion of the UV coordinate screen space.

16. The method of claim 10, wherein the rotation matrix is obtained from the interactive content player device, and the rotation matrix indicates a position of a user's head.

17. The method of claim 10, wherein the rotating the virtual spherical coordinates using the rotation matrix comprises multiplying the virtual spherical coordinates by the rotation matrix, and subsequently normalizing a resultant vector to a predetermined length.

18. The method of claim 10, wherein if the point of the UV coordinate screen space to procedurally render is within the second portion of the UV coordinate screen space, the determining the equirectangular UV coordinate values within the stereoscopic equirectangular video frame using the rotated virtual spherical coordinates further comprises subsequently adding a predetermined value to at least one of the equirectangular UV coordinate values.

19. A non-transitory computer readable medium comprising instructions that, when executed, cause one or more processors to perform:
- obtaining interactive content, the interactive content including a stereoscopic equirectangular video frame;
- generating a UV coordinate screen space, the UV coordinate screen space corresponding to a physical screen of an interactive content player device;
- computing a first location of the UV coordinate screen space, the first location of the UV coordinate screen space comprising a first center of a first portion of the UV coordinate screen space;
- computing a second location of the UV coordinate screen space, the second location of the UV coordinate screen space comprising a second center of a second portion of the UV coordinate screen space;
- selecting a point of the UV coordinate screen space to procedurally render, the point to procedurally render being within the first portion of the UV coordinate screen space or the second portion of the UV coordinate screen space;
- computing virtual spherical coordinates using the point of the UV coordinate screen space to procedurally render, the computing the virtual spherical coordinates comprising projecting a line from an origin of a virtual sphere through a plane at the point of the UV coordinate screen space to procedurally render, the plane lying at a radius of the virtual sphere, and subsequently deriving an azimuth value and an altitude value based on the projected line;
- obtaining a rotation matrix;
- rotating the virtual spherical coordinates using the rotation matrix;
- determining equirectangular UV coordinate values within the stereoscopic equirectangular video frame using the rotated virtual spherical coordinates, the equirectangular UV coordinate values being based on a rotation of the azimuth and altitude values;
- identifying pixel values of the stereoscopic equirectangular video frame using the equirectangular UV coordinate values; and
- returning the pixel values of the stereoscopic equirectangular video frame for the UV coordinate screen space, thereby causing a corresponding presentation on the physical screen of the interactive content player device.

\* \* \* \* \*